July 28, 1959  F. I. ERNEST  2,896,954
WORK MOUNTING CHUCK
Filed Nov. 16, 1955
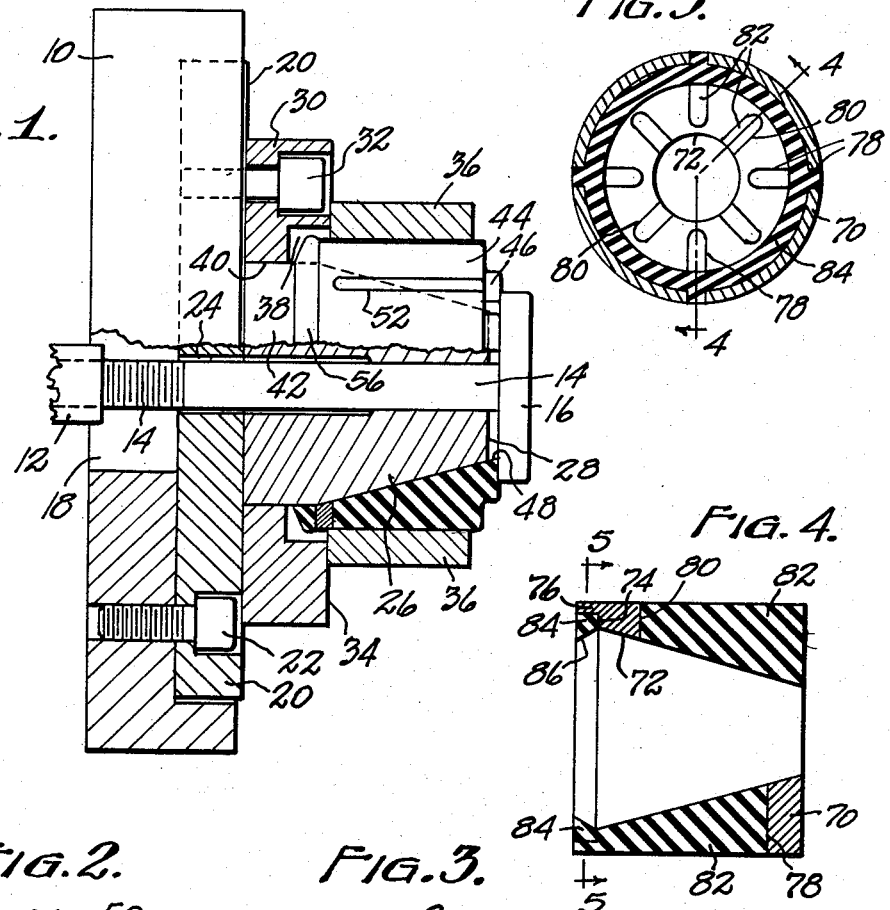
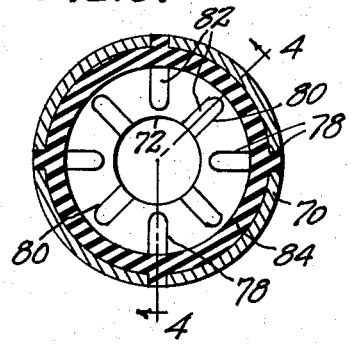
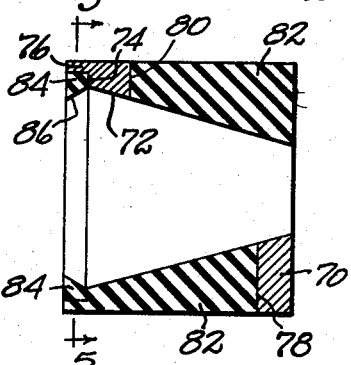
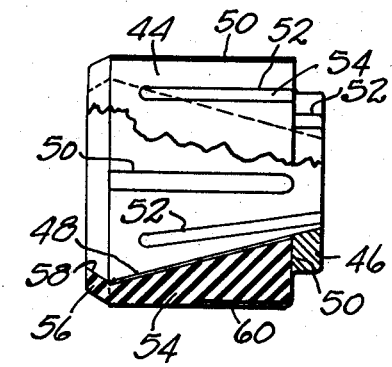
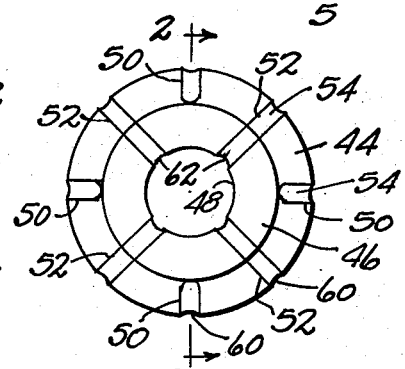
INVENTOR.
FREDERICK I. ERNEST.
BY
Eugene C. Knoblock
ATTORNEY.

United States Patent Office 2,896,954
Patented July 28, 1959

2,896,954

WORK MOUNTING CHUCK

Frederick I. Ernest, Elkhart, Ind.

Application November 16, 1955, Serial No. 547,062

10 Claims. (Cl. 279—2)

This invention relates to improvements in work mounting chucks, and more particularly to expansible chucks usable with devices such as the precision expansion adapter illustrated in my United States Patent No. 2,469,873, dated May 10, 1949.

The primary object of this invention is to provide a work-mounting chuck of this character which is formed of a unitary piece of metal having slots therein accommodating flexing thereof and wherein rubber is molded in place in the slots to close the slots without preventing deflection of the material between the slots.

A further object is to provide a device of this character having a novel dust-sealing lip formed of rubber located at one end of a work-mounting chuck so as to exclude dust and dirt from the apparatus mounting the chuck.

Other objects will be apparent from the folowing specification.

In the drawing:

Fig. 1 is a fragmentary view of a precision expanding adapter employing my improved chuck with parts shown in section;

Fig. 2 is a side view of the chuck with parts shown in section taken on line 2—2 of Fig. 3;

Fig. 3 is an end view of the chuck as viewed from the right in Fig. 2;

Fig. 4 is an axial sectional view of a modified embodiment of the chuck taken on line 4—4 of Fig. 5; and Fig. 5 is a transverse sectional view taken on line 5—5 of Fig. 4.

Referring to the drawing which illustrates the preferred embodiment of the invention, the numeral 10 designates a spindle adapter to be mounted in fixed position upon a machine provided with suitable equipment, such as a hydraulic or pneumatic power unit, for selectively pulling upon or releasing for movement in an axial direction a member 12 which carries a draw member 14, such as a bolt having an enlarged head 16. The member 12 and the bolt 14 have clearance with the adapter 10 by passing through an opening 18 in said adapter. A nose plate 20 is mounted in a recess in the adapter 10 and is anchored thereto by means of securing bolts 22. The nose plate 20 preferably projects slightly beyond the outer face of the adapter plate and has a central aperture 24 receiving the bolt 14 therethrough with clearance. The bolt 14 mounts a frusto conical member 26 at its outer end whose small dimension end surface 28 preferably terminates spaced from the inner face of the bolt head 16. A work spacing ring 30 is mounted upon the nose plate 20 by means of machine screws 32 or other suitable securing means. The ring 30 has an outer face 34 providing an abutment for a work piece 36 and also has a recess 38 in its outer face concentric therewith and also concentric with the bore 40 of the ring which preferably fits snugly around a cylindrical portion 42 of the tapered member 26.

My improved expansible bushing is mounted upon the tapered member 26 in engagement with the head 16 and within the work piece 36. In the form illustrated in Fig. 2, the bushing 44 is of generally cylindrical shape in its outer outline and may have a reduced neck portion 46 at one end thereof. The bushing body 44 has a tapered bore 48 formed therein and extending from end to end thereof. The taper of this bore normally conforms precisely with the taper of the frusto conical member 26 of the adapter. One set 50 of slots, preferably longitudinal radial slots, are formed in the body 44, preferably extending from the end of the body having the large end of the bore to the opposite end of the body adjacent to or inwardly from the inner portion of the neck 46. The other set 52 of slots, also preferably longitudinal radial slots, extends from the opposite end of the chuck and terminates spaced from the end having the large bore portion. The slots of each set are equal in length and are equiangularly related to one another and to the slots of the other set which likewise are of substantially equal length. Thus at each end of the device, the same is divided into a plurality of spaced fingers, and the fingers at the opposite ends are out of register with one another. The construction also entails the filling of the slots with bodies of rubber 54 extending full length and substantially full depth of the slots and preferably terminating in a ring portion 56 projecting from the body 44 adjacent the large diameter end of the bore 48. Portion 56 has a reduced bore, preferably a frusto conical inner surface 58, such that the free edge of the ring or skirt portion 56 has a smaller inner diameter than the portion thereof adjacent the body 44 from which it projects. The parts 54 and 56 are preferably formed of rubber although they maybe formed from synthetic rubber such as "neoprene," "hycar," or the like. The rubber body is preferably molded in place and has a firm and effective bond with the metal.

In order to accommodate machining of the outer cylindrical surface of the body and of the tapered inner surface thereof, parts of the rubber webs 54 may be grooved or inset, as shown at 60 at the outer surface of the device and as shown at 62 at the inner surface. This is optional, however.

In the use of the device the bushing is mounted upon the tapered member 26 behind the bolt head 16 and projects from the tapered nose 26. The skirt or lip 56 fits snugly around the nose, being expanded to fit thereon and, therefore, having a snug constrictive fit therewith. This insures that dirt will be effectively excluded at the large diameter end of the bore and cannot pass to the tapered interfitting surfaces of the nose 26 and the bushing. The continuous engagement of the head 16 of the bolt with the opposite end of the bushing and with the rubber fillings of the slots 52 insures that dust and dirt cannot enter into the bore of the device from the outer end of the bushing. When the parts are properly adjusted the member 12 may move between a releasing position in which the bolt is urged toward the right to the extent necessary to permit the bushing to contract to its normal size and a position at the left in which the bolt is drawn inwardly to press longitudinally upon the bushing and cause its tapered surface 48 to ride upon the tapered surface of the nose 26 of the device to expand the same radially and into firm frictional engagement with the work piece 36. The work piece 36 will have a bore having a normal free sliding fit upon the outer surface of the bushing to accommodate ease of application and removal of the work piece when the bushing is in its normal form. Operation of the device to expand the bushing will hold the work piece upon the bushing with a firm frictional fit adequate to accommodate machining of the work piece. The rubber, while filling the space between the fingers of the bushing to exclude the passage of dirt and dust between the fingers, at the same time is yieldable so as to accommodate separation of the fingers, namely, by stretching or expanding the rubber. The bond of the rubber with the metal will be sufficient to withstand this stretching action without release.

A modified form of the bushing is illustrated in Figs. 4 and 5 in which the general outline of the bushing is uniform throughout its length and in which a dust-sealing ring at the large end of the bore is inset within the outline of the body. The body 70 has a tapered or frusto conical bore 72 which communicates with a recess 74 at its large diameter end, thus providing a reduced ring or annulus 76 integral with the body and adjacent to the large diameter end of the bore. Slots 78 extend from the lefthand end of the body, as illustrated in Fig. 4, to a point terminating spaced from the righthand end thereof, and slots 80 extend from the righthand end of the body to a point terminating spaced from the recess 74. These slots are equally spaced and are equiangularly related and are of substantially equal length so as to form two sets of fingers at opposite ends of the device which are out of the register with one another. Rubber or artificial rubber 82 is molded within the slots 78 and 80 to fill the same, and integral therewith is a ring 84 formed within the recess 74 and having reduced bore 86 preferably reversely tapered and frusto conical, as seen in Fig. 4.

This construction of bushing has the same advantages as that shown previously, including the complete dust seal without restraint of the expansion of the bushing and with a minimum overall length of the device, so that the dust-sealing skirt portion 84 at the large diameter end thereof is fully protected at all times by the annulus 76 of the body within which it is located.

While the chuck has been illustrated herein as of the expansible type, it also may be of the contracting type, in which event the outer peripheral surface thereof will preferably be tapered and the bore will be of a shape to grip a work piece therein when the chuck body is shifted axially.

While the preferred embodiments of the invention have been illustrated and described, it will be understood that changes in the construction may be made within the scope of the appended claims without departing from the spirit of the invention.

I claim:

1. An expanding chuck adapted to be mounted on a tapered nose to be shifted axially thereon in opposite directions to selectively expand and contract the same, comprising a metal body adapted for normal snug sliding fit in a work piece and having an axially extending tapered bore therethrough, said body having two sets of longitudinally and radially extending equispaced slots therein arranged in alternate relation, the slots of one set extending to one end of said body and those of the other set extending to the other end of said body, said slots extending between the inner and outer surfaces of the body for the major portion of the length of said body to define flexible fingers therebetween having continuous longitudinal edges, and elastic material filling said slots full length and bonded to said body to accommodate expansion of said body without opening said slots to entry of dirt therein.

2. The construction defined in claim 1, and an elastic annular inwardly projecting rib member carried by one end of said body and having an inner diameter smaller than the bore of the adjacent part of said body.

3. An expanding chuck adapted to be mounted on and to shift axially of a tapered member to be selectively adjusted between normal work-receiving size and expanded work-chucking size, comprising a metal body having a tapered axial bore and a plurality of elongated longitudinal slots extending more than one-half the length of said body, and each open at both the inner and outer surfaces of the body, alternate slots extending to opposite ends of said body, and elastic material extending substantially from end to end of said body filling said slots and bonded to said body the portions of said chuck between said slots having continuous edges engageable with the work and with said tapered member.

4. An expanding chuck adapted to be mounted on and shifted axially of a tapered member by an actuating member having an enlarged head to be selectively adjusted between normal work-receiving size and expanded work-chucking size, comprising a metal body having a tapered axial bore and a plurality of elongated longitudinal finger-defining equiangularly related slots each extending more than one-half the length of said body, alternate slots extending to opposite ends of said body, and elastic material filling said slots and bonded to said body full length of said slots, the elastic material in the slots open at the end of the body at which the small end of the bore opens being substantially flush with said end surface for engagement with said enlarged head.

5. An expanding chuck adapted to be mounted and to shift axially of a tapered member to be selectively adjusted between normal work-receiving size and expanded work-chucking size, comprising a body having a tapered axial bore and a plurality of elongated longitudinal equiangularly related slots of substantially equal length and extending for the major portion of the length of the body, alternate slots extending to opposite ends of said body, and elastic material extending full length of said body and filling said slots and bonded to said body, the inner surfaces of the elastic material being offset inwardly relative to the surface of the bore of the body for at least a part of the length of said body.

6. An expanding chuck adapted to be mounted and to shift axially of a tapered member to be selectively adjusted between normal work-receiving size and expanded work-chucking size, comprising a body having a tapered axial bore and a plurality of elongated longitudinal finger-defining equiangularly related slots each extending more than one-half the length of the body, alternate slots extending to opposite ends of said body, and elastic material extending full length of said body and filling said slots and bonded to said body, and an annular portion of said elastic material projecting inwardly from one end of said body and having an inner diameter portion smaller than the adjacent part of said bore.

7. An expanding chuck adapted to be mounted and to shift axially of a tapered member to be selectively adjusted between normal work-receiving size and expanded work-chucking size, comprising a body having a tapered axial bore and a plurality of elongated longitudinal finger-defining equiangularly related slots extending for the major portion of the length of said body, alternate slots extending to opposite ends of said body, and elastic material filling said slots from end to end thereof and bonded to said body, and an annular elastic inwardly projecting ring member carried by one end of said body and having a tapered bore of which a portion is smaller than the adjacent part of said first bore.

8. An expanding chuck adapted to be mounted and to shift axially of a tapered member to be selectively adjusted between normal work-receiving size and expanded work-chucking size, comprising a body having a tapered axial bore and a plurality of elongated longitudinal finger-defining equiangularly related slots extending for the major portion of the length of said body, alternate slots extending to opposite ends of said body, and elastic material filling said slots full length and bonded to said body, said body having an annular recess at one end communicating with said bore, and an annular elastic skirt bonded in said recess and having an inner diameter smaller than the adjacent part of said bore.

9. A work holder comprising a frusto conical member having an axial bore, a draw member shiftable axially in said bore and having an enlarged head, an expansible chuck having a tapered bore receiving said first member and having concentric end engagement with said head, said chuck having a plurality of elongated equispaced slots extending for the major part of the length thereof with alternate slots extending to opposite ends thereof, a work piece encircling said chuck and elastic material filling said chuck slots from end to end and cooperating with said head to seal the interfitting tapered surfaces of said chuck and first member.

10. A work holder comprising a frusto conical member having an axial bore, a draw member shiftable axially in said bore and having an enlarged head, an expansible chuck having a tapered bore receiving said first member and having concentric end engagement with said head, said chuck having a plurality of elongated equispaced slots extending for the major part of the length thereof with alternate slots extending to opposite ends thereof, a work piece encircling said chuck, elastic material filling said chuck slots from end to end and cooperating with said head to seal the interfitting tapered surfaces of said chuck and first member, and an annular elastic member at the end of said chuck at which the large end of said chuck bore communicates, said annular elastic member constrictively encircling said first member.

References Cited in the file of this patent
UNITED STATES PATENTS

| | | |
|---|---|---|
| 2,346,706 | Stoner | Apr. 18, 1944 |
| 2,346,707 | Stoner | Apr. 18, 1944 |
| 2,403,136 | Stoner | July 2, 1946 |
| 2,466,129 | Stoner | Apr. 5, 1949 |
| 2,469,873 | Ernest | May 10, 1949 |
| 2,695,787 | Sunnen | Nov. 30, 1954 |